United States Patent
Engel

(10) Patent No.: US 8,554,721 B2
(45) Date of Patent: Oct. 8, 2013

(54) SYSTEMS AND METHODS FOR REPLICATING VALUES FROM MULTIPLE INTERFACE ELEMENTS

(75) Inventor: Christof Engel, Rauenberg (DE)

(73) Assignee: SAP AG (TH), Waldorf (DE)

( * ) Notice: Subject to any disclaimer, the term of this patent is extended or adjusted under 35 U.S.C. 154(b) by 265 days.

(21) Appl. No.: 12/853,557

(22) Filed: Aug. 10, 2010

(65) Prior Publication Data

US 2012/0041985 A1 Feb. 16, 2012

(51) Int. Cl.
*G06F 7/00* (2006.01)
*G06F 17/00* (2006.01)

(52) U.S. Cl.
USPC .............. 707/609; 707/634; 707/635; 706/11

(58) Field of Classification Search
None
See application file for complete search history.

(56) References Cited

U.S. PATENT DOCUMENTS

| | | | | |
|---|---|---|---|---|
| 7,152,220 B2* | 12/2006 | Rickards et al. | | 717/101 |
| 7,797,351 B2* | 9/2010 | Beck | | 707/803 |
| 2002/0019730 A1* | 2/2002 | Garner et al. | | 703/14 |
| 2004/0220926 A1* | 11/2004 | Lamkin et al. | | 707/3 |
| 2006/0294157 A1* | 12/2006 | Kumpitsch et al. | | 707/201 |
| 2008/0134178 A1* | 6/2008 | Fitzgerald et al. | | 718/1 |
| 2008/0168135 A1* | 7/2008 | Redlich et al. | | 709/204 |
| 2008/0195651 A1* | 8/2008 | Rachmiel et al. | | 707/102 |
| 2009/0006467 A1* | 1/2009 | Visscher | | 707/103 Y |
| 2009/0157419 A1* | 6/2009 | Bursey | | 705/1 |

\* cited by examiner

*Primary Examiner* — Angelica Ruiz
(74) *Attorney, Agent, or Firm* — Finnegan, Henderson, Farabow, Garrett & Dunner LLP

(57) ABSTRACT

Systems and methods presented herein allow a user to select multiple interface elements, simultaneously copy the selected elements, and simultaneously replicate the data values from the multiple interface elements into existing corresponding interface elements. The user selection includes first and second interface elements presented on a display device, each of the selected interface elements comprising metadata and a data value. The selected elements can be copied by creating and storing a data template that includes the metadata and data values of the first and second interface elements. The data template can then be compared against other existing interface elements to identify corresponding interface elements, such that the data values of the copied interface elements can be replicated into the identified corresponding interface elements.

23 Claims, 9 Drawing Sheets

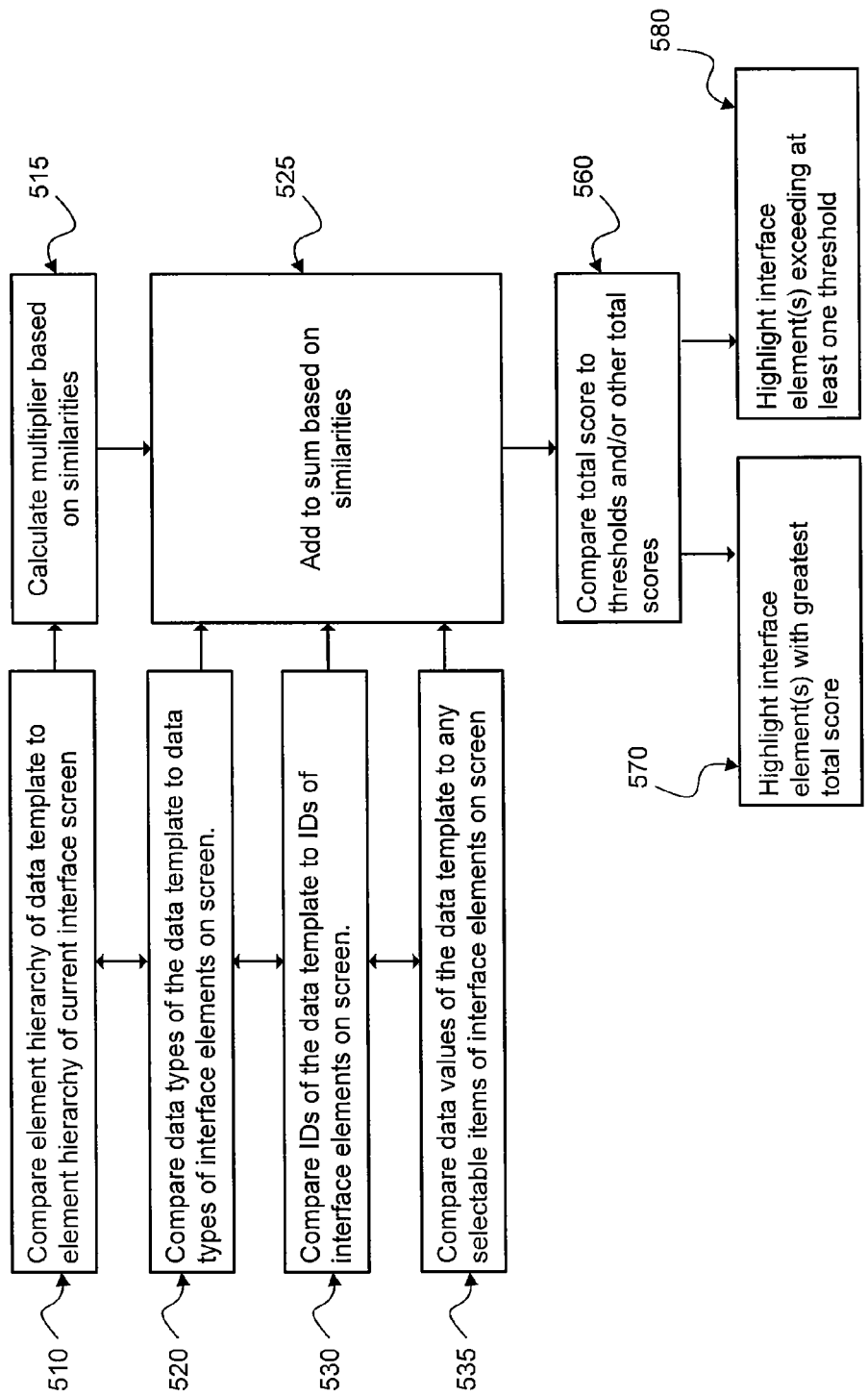

SYSTEMS AND METHODS FOR REPLICATING VALUES FROM MULTIPLE INTERFACE ELEMENTS

DESCRIPTION OF THE EMBODIMENTS

1. Field of the Embodiments

The embodiments relate generally to computer-implemented copy and paste technologies, and, more specifically, to systems and methods for copying data values in parallel (i.e., simultaneously) from a first plurality of interface elements into a second plurality of interface elements.

2. Background

User interfaces are commonly used in all computer applications for displaying and receiving information from a user. A screen of a user interface can include various interface elements, such as text boxes, date boxes, drop-down boxes, radio buttons, etc. These interface elements are presented to a user, who enters information into them by manipulating the state (i.e., current value) of each interface element. For example, the user might type a name into a text box designated to receive a name, which thus sets the data value of the corresponding text box element to a string representing the typed name. Additionally, the user might select a surname from a drop-down box, setting the data value of the drop-down box element to represent "Mr." The user could also select a date from a calendar component that populates a date field, setting the data value accordingly. Consequently, once populated, each interface element has a representative data value. (Before being populated, the data value can be blank or some other default value.)

In many applications, similar (or the same) interface elements might need to be populated with related information. As a simple example, sometimes text fields related to a shipping address will need to be populated similarly to address fields related to a home address. For such situations, application-specific programming may be used to automatically copy information from multiple interface elements to others—such as from particular home address text fields into particular shipping address text fields. Because such fields are pre-linked programmatically, the application does not need to determine that the home address fields correlate directly to the shipping address fields. Instead, when the user clicks a button, the interface may automatically replicate the data values in a pre-defined and static way.

However, in many cases, interface elements are not explicitly and statically linked in order to allow simultaneously copying of values from one set of interface elements to another. This is currently the case when a user wishes to replicate interface element values in one application to interface elements in another application (e.g., from one web page to another). It is also frequently the case within a single application. For example, a user interface for a document repository application might require the user to populate several interface elements for each new document (e.g., text boxes for document name, client, author, and document category) without providing any means for pasting values into multiple interface elements at one time.

Outside of the above scenarios, a user cannot replicate (e.g., drag and drop, or copy and paste) values simultaneously (i.e., in parallel) from one set of interface elements into another set. Instead, the user must replicate the data values one at a time, in a serial approach. This usually involves copying the value of each interface element, one at a time, and pasting (e.g., dropping) the value into the related interface element. This serial approach can become time consuming and inconvenient.

Additionally, pre-programmed buttons and other mechanisms for copying data values from particular interface elements to others are, by nature, inflexible and static in terms of the copy destination. Moreover, there currently does not exist a convenient and generic way to replicate the data value (i.e., state) of some types of interface elements—particularly element types other than text fields. For example, replicating data values from radio buttons or drop-down lists currently requires the user to manually reenter each value. Furthermore, there currently does not exist a convenient and generic way to replicate the state or value of a first interface element, containing a data value of a first type, into a second interface element containing a data value of a second (and different) type. Similarly, it is currently inconvenient to replicate values between different types of interface elements (i.e., between different element types). In those instances, the user must manually reenter each value.

Accordingly, systems and methods are provided herein for replicating data values in parallel (i.e., simultaneously) from a first plurality of interface elements into a second plurality of interface elements. Systems and methods provided herein also allow for replicating data values (i.e., states) between interface elements of different element types and/or data types.

SUMMARY

In an embodiment, a computer-implemented method allows a user to select multiple interface elements in parallel, simultaneously copy the selected interface elements, and replicate the data values in parallel from the multiple interface elements into existing corresponding interface elements. The method may include receiving a user selection that includes first and second interface elements presented on a display device, the first and second interface elements each having an associated metadata and a data value.

A data template may be created and stored in memory, wherein the data template includes the metadata and data values of the first and second interface elements. The data template can also be represented in a clipboard or some other intermediate layer that is not part of the interface screen. An embodiment may utilize the data template to identify interface elements that correspond to the copied interface elements. For example, this can include comparing metadata from the data template to metadata of a second plurality of interface elements presented on a display device to identify the corresponding interface element(s). Once one or more corresponding interface elements have been identified, the data values of the corresponding interface elements can be changed to represent the data values of the respective copied interface elements.

The metadata contained in the data template can include metadata from other interface elements in addition to those specifically selected by the user. For example, metadata from a container holding a selected interface element can be included in the data template.

In one aspect, the data template has a tree structure. The tree structure may emulate an element hierarchy corresponding to the selected elements.

In one embodiment, a first data value from a first interface element is set according to a second data value of a second interface element that is of a different element type than the first interface element. For example, the first interface element can be a combo box while the second is a radio button.

In addition to computer-implemented methods, embodiments disclosed herein include a non-transitory tangible computer-readable medium and a system that includes a processor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 5A is an exemplary flow chart with a non-exhaustive listing of steps that may be included in a comparison algorithm, in accordance with an embodiment;

DESCRIPTION OF THE EMBODIMENTS

Figure 1A:
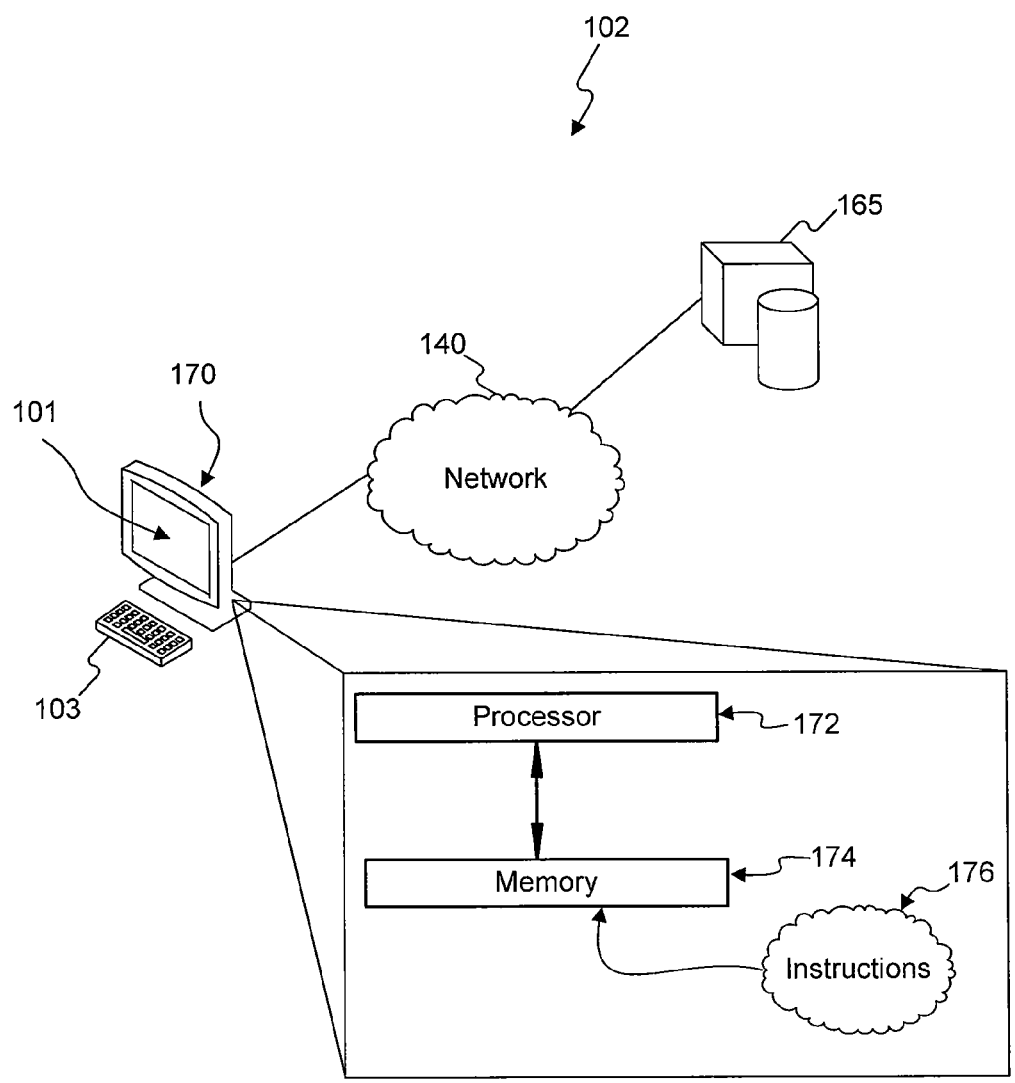
FIG. 1A is an exemplary illustration of a system capable of simultaneously replicating the data values of a plurality of interface elements, in accordance with an embodiment.

Reference will now be made in detail to the present exemplary embodiments, including examples illustrated in the accompanying drawings. Wherever possible, the same reference numbers will be used throughout the drawings to refer to the same or like parts.

Exemplary embodiments herein allow a user to select a first plurality of interface elements at the same time, and replicate the contents of the selected interface elements to a second plurality of interface elements. This is facilitated with a copy/paste or drag & drop approach that simultaneously changes the data values of the second plurality of interface elements, rather than requiring the user to individually copy and paste interface elements one at a time. As used herein, "simultaneously" can mean "with one action." Therefore, when the user executes a paste command or releases a drag & drop operation, that single action can cause a plurality of interface elements to be updated. Likewise, a single copy command can cause more than one interface element to be copied into memory, such as in the form of a data template (discussed later). For the purposes of this disclosure, a copy command (i.e. copy action) or paste command (i.e., action) can also refer to drag and drop features in addition or alternatively to traditionally understood copy and paste commands.

Exemplary embodiments may also create a data template to represent the copied interface elements. The data template can reside in memory and be utilized when the user pastes (e.g., drags) the copied interface elements into a region. In one embodiment, the data template can be stored in memory accessed by a clipboard application or associated with some other intermediate layer (e.g., database or specialized copy and paste storage), such that the template can later be recalled with a paste action or a preview algorithm or action.

A processor can identify potential targets (i.e., corresponding interface elements) by executing an algorithm that compares the data template to displayed interface elements, in accordance with one embodiment. As will be explained in detail herein, the algorithm can take into account one or more similarities between selected interface elements, including element type hierarchies, data type hierarchies (i.e., data types arranged according to the element hierarchy), ID hierarchies (i.e., identification hierarchies, in which element IDs (i.e., identifications) arranged according to the element hierarchy), and data value hierarchies (i.e., data values arranged according to the element hierarchy) to identify correlating interface elements for receiving the copied data values.

As referred to above and herein, an "interface element" is a part (i.e., a component) of a user interface that contributes to the presentation or reception of information displayed and/or received from a user. Some interface elements include a "data value," which is also known as a "state." Examples of interface elements having a state (i.e., data value) include a text field, combo box, a drop-down list, an item list, a radio button, a button with a state (e.g., a button that can remain depressed, and having a different value when depressed than when raised), and a date component. Typically, interface elements that are modifiable by a user can have a value. Other interface elements do not have data values, but instead are used for arranging components (e.g., interface elements with data values) on the screen. Examples of interface elements that typically do not have a data value include a layout container, a group box, and other similar components.

The terms "data value" and "state" are used synonymously above and herein. For example, the state of a text field (i.e., text box) is understood to be whatever text the text field currently contains. Similarly, the data value of a drop-down box can reflect the item that is currently selected (or displayed) in the drop-down box. Additionally, the "data value" or "state" can comprise numerous data types. For example, the data type could be a Boolean value, a number (e.g., integer, float, etc.), text (e.g., string), a date, or any other predefined data type, including custom data types.

An interface element can comprise metadata and a data value. In one aspect, a user interface can separate interface elements from the underlying data, providing a front-end hierarchy of interface elements and a separate corresponding hierarchy of data values. Even in such an arrangement, for the purposes of this disclosure, the interface element comprises both the corresponding metadata and data value.

Embodiments herein include computer-implemented methods, tangible non-transitory computer readable mediums, and systems. The computer-implemented methods can be executed, for example, by a processor that receives instructions from a non-transitory computer-readable storage medium. Similarly, a system described herein can include a processor and a memory, and the memory can be a non-transitory computer readable storage medium. As used herein, a non-transitory computer-readable storage medium refers to any type of physical memory on which information or data readable by a processor can be stored. Examples include random access memory (RAM), read-only memory (ROM), volatile memory, nonvolatile memory, hard drives, CD ROMs, DVDs, flash drives, disks, a database, and any other known physical storage medium. Singular terms, such as "memory" and "computer-readable storage medium," can additionally refer to multiple structures, such a plurality of memories and/or computer-readable storage mediums. As referred to herein, a "memory" can comprise any type of computer-readable storage medium unless otherwise specified. A computer-readable storage medium can store instructions for execution by a processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1A is an exemplary illustration of a system 102 capable of replicating the data values of a plurality of interface elements, in accordance with an embodiment. As shown in FIG. 1A, system 102 may include a computing device 170. The computing device 170 can be any computer, laptop, portable display apparatus (PDA), phone, or similar electronic device. The computing device 170 can comprise an input device 103 (e.g., a keyboard, touch screen, microphone, motion sensor, and/or mouse) and a display device 101 (e.g., a screen).

In one embodiment, the system 102 is contained within computing device 170. For example, a processor 172 may execute instructions 176 stored on memory 174. In this way, the memory 174 is communicatively coupled to processor 172 such that the processor 172 receives all the requisite instructions from memory 174. As a result, at least one user interface screen 100 (shown in FIG. 1B) is displayed on a screen of a display device 101. A user can use input device 103 to manipulate the user interface screen 100 in accordance with an embodiment, as described below beginning with a description of FIG. 1B.

In another embodiment, the system also comprises remote computing device 165, which can include one or more servers. In that embodiment, some interactions occur over network 140. Network 140 can include the Internet in one embodiment. Other networks are also possible, including Ethernet and local area networks. Network 140 can also be public or private network. Examples of activities that can take place over network 140 include storing data in a remote memory (such as in remote computing device 165), running a remote application using a remote processor, and receiving (from remote computing device 165) instructions or information relevant to running a local application on computing device 170.

Figure 1B:
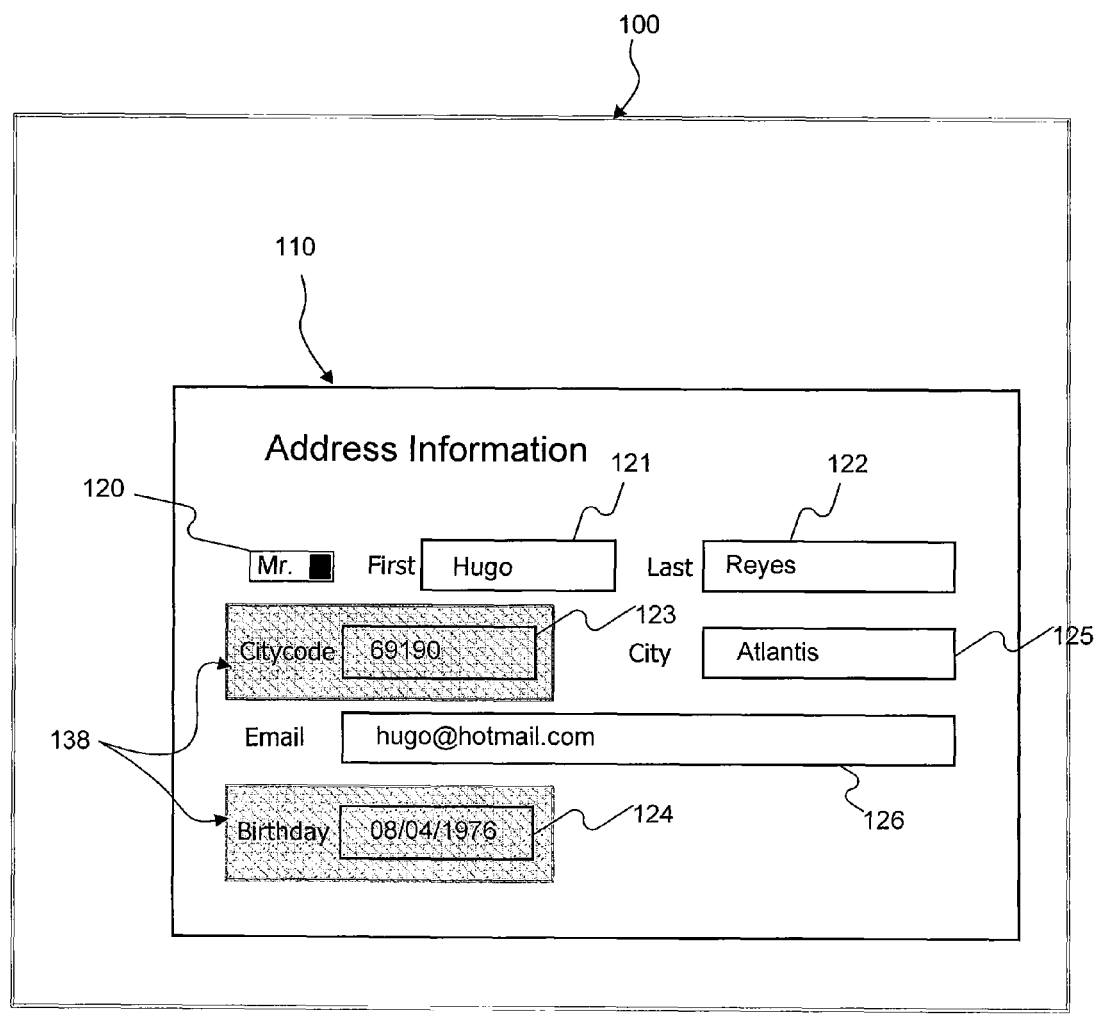
FIG. 1B is an exemplary illustration of a screen including a user interface with multiple interface elements, in accordance with an embodiment.

Turning now to FIG. 1B, an exemplary illustration of a user interface screen 100 is shown, including a user interface layout container 110 with multiple other interface elements 120, 121, 122, 123, 124, 125, and 126, in accordance with an embodiment. Layout container 110 can be part of a larger user interface presented on the screen 100 to the user.

As illustrated, layout container 110 contains a collection of interface elements representing personal information. These displayed contents of each interface element can represent the respective data values. Interface element 120 is a drop-down list, wherein the "Mr." item is currently selected and visible. Interface elements 121 and 122 are text boxes (i.e., text fields) that contain text indicative of first and last names, and, in this case, "Hugo" and "Reyes," respectively. Interface element 123 can be a custom component containing a city code, which is an integer. Related text box 125 contains the text "Atlantis," which represents the city name associated with Citycode value "69190." The email interface element 126 is yet another text box with a data value representing an email address. The birthday interface element 124 is a date component that contains a date data type, such as through the selection of a date using a calendar component.

In the example of FIG. 1B, a user has selected two interface elements 123 and 124 to be copied. In this example, the selected interface elements 138 can be indicated by a visual cue that informs the user that the Citycode and Birthday interface elements 123 and 124 are currently selected. The visual cue can vary between embodiments. For example, the visual cue can include a box, an icon, a shaded region, displaying selected interface element data values in a new color, or any other visual aspect that represents the interface element selection. In another embodiment, multiple interface elements can be selected without the provision of a visual cue.

Different implementations are provided for allowing the user to select multiple interface elements. In one implementation, the user can hold down a particular key, such as the control key, and each interface element clicked by the user while holding down the key will be selected.

Once a plurality of interface elements (e.g., 123 and 124) have been selected, the user can simultaneously copy the selected interface elements in order to replicate the corresponding data values into other interface elements that are related to the selected interface elements. The user invokes a copy command (i.e., copy action) through typing a key shortcut, selecting a menu item, dragging the selected interface elements as part of a drag & drop operation, or by executing any other trigger for a copy command currently known in the art.

In one aspect, information about the selected and/or copied interface elements is stored in memory as a data template. In one embodiment, the stored data template can be accessed across multiple programs via an intermediate layer, such as through use of a "clipboard" or similar programmatic feature, which can be associated with the operating system. The information in the data template can be stored in a tree structure that includes one or more hierarchies, such as an element hierarchy, a data type hierarchy, an ID hierarchy, and a data hierarchy. This information can be used by an algorithm to detect corresponding interface elements (such as later described in FIG. 5). These various hierarchies are discussed in turn below, and also summarily with respect to FIG. 4B.

Figure 2:
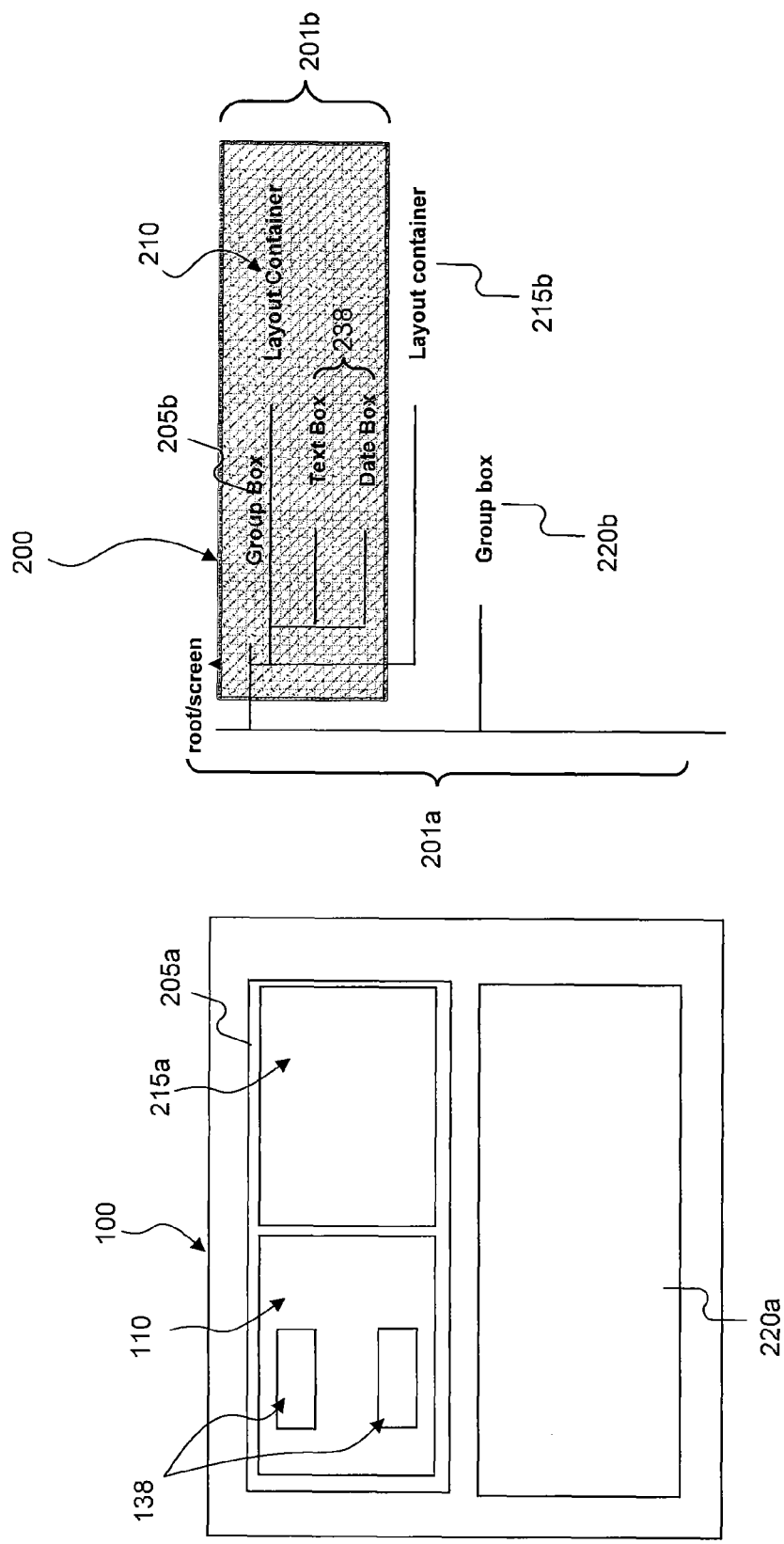
FIG. 2 is an exemplary illustration of correlations between selected interface elements and an exemplary element hierarchy of a data template, in accordance with an embodiment.

Turning now to FIG. 2, an example data template 200 including an element hierarchy 201$b$ is discussed. FIG. 2 illustrates interface screen 100, with several interface elements from FIG. 1B shown in outline form. For example, selected interface elements 138 correspond to the selected elements 138 in FIG. 1B.

The data template 200 represents the selected interface elements 138, arranged in an element hierarchy 201$b$. The element hierarchy 201$b$ can be represented and/or stored in a tree structure, as part of the data template 200, in one aspect.

The tree structure can represent the physical relationship of the interface elements to one another when displayed on interface screen 100. Additionally, in one embodiment the element hierarchy 201*b* can reflect a subset of the total element hierarchy 201*a* of the entire interface screen 100. Thus, as illustrated, the data template 200 will contain only a subset 201*b* of the total possible element hierarchy 201*a*. Alternatively, the data template 200 can include a complete element hierarchy 201*a* of an entire interface screen 100.

In one embodiment, the element hierarchy 201*b* incorporated into the data template 200 is limited to the selected interface elements 138 (as indicated by the box in FIG. 2 representing the data template 200). However, in another embodiment, the data template 200 includes information related to additional interface elements (e.g., 205*b* and 210) of the total element hierarchy 201*a*. In one embodiment, some of the additional included interface elements are not specifically selected by the user, such as containers or other grouping/organizational information. In this way, the element hierarchy 201*b* of data template 200 can include information indicative of how the selected interface elements 138 are organized relative to other information on the screen 100. Such information can be used to identify interface elements that correspond to the selected elements 138.

In the example of FIG. 2, the physical layout of the selected interface elements 138 in screen 100 is shown. More particularly, the selected interface elements 138 are contained within a layout container 110. Layout container 110 and an additional layout container 215*a*, in turn, are contained within group box 205*a* (which could be an additional layout container).

Staying with this example, the tree structure of the data template 200 is arranged in an element hierarchy 201*b* that follows the arrangement of interface elements in screen 100. For example, the element hierarchy 201*b* of data template 200 contains metadata indicating that a group box 205*b* contains a layout container 210, which in turn contains selected elements 238. Although the element hierarchy of the data template 200 in this example does not include information relating to layout container 215*b* or group box 220*b*, the data template can contain such information (or other information from the screen's total element hierarchy 201*a*) in another embodiment.

Figure 3:
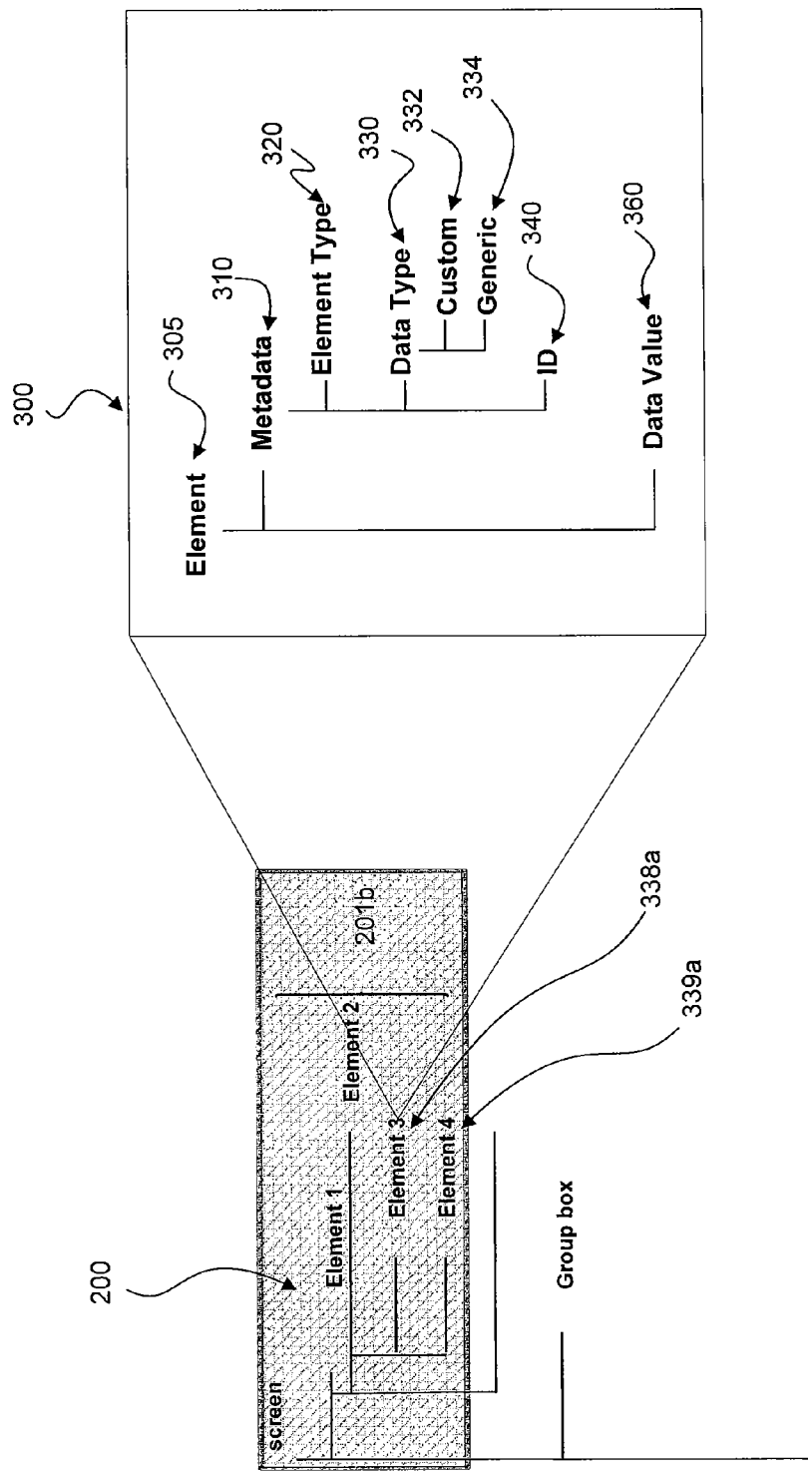
FIG. 3 is an exemplary illustration of the types of information stored in a data template, in accordance with an embodiment.

Expanding on the element hierarchy 201*b*, FIG. 3 is an exemplary illustration of the types information 300 stored in a data template for each element, in accordance with an embodiment. In one embodiment, this information 300 can be stored as part of the tree structure previously described for element hierarchy 201*b*. For example, the tree could extend from element 338*a* beginning at 305 to include the additional information 300 relevant to interface element 338*a*, as illustrated in FIG. 3.

As shown in FIG. 3, each interface element 300 of a data template 200 can include metadata 310 and, where applicable, a data value 360. Turning first to metadata 310, several types of information for an interface element 305 are possible. The metadata 310 can contain the element type 320. This is also apparent in FIG. 2, which illustrates a data template 200 (and element hierarchy 201*b*) that includes information regarding the various element types. For example, as shown in FIG. 2, the element types of element hierarchy 201*b* include a group box 205*b*, layout container 210, text box, and date box 238. In another embodiment, the date box can be treated as the same element type as a text box (i.e., text field).

The metadata 310 can include a data type 330 in one embodiment. The data type 330 corresponds to the type of data represented by the data value 360 of the interface element 305. Examples of data types include Boolean, number (e.g., integer, float, etc.), text (e.g., string), date, or any other predefined data type, including custom data types.

For custom data types, the metadata can include a custom data type. For example, the data type CCTS-Code-City is a custom data type that can be recognized by SAP software. Custom data types 332 can be defined for a specific application, across a set of applications, or even adopted by different development companies.

The metadata can also contain generic data types, as mentioned above (integer, text, date, etc.). In one aspect, even when a custom data type 332 is included for an interface element 305, a generic data type 334 is included in the data template 200 as well. This is because, by nature, more applications will recognize generic data types 334 than custom data types 332, which may be specific to only one or a few applications. While a custom data type 332 can be more specific, and, therefore, more useful in detecting a corresponding interface element, the custom data type 332 may be of little to no use in an application that does not recognize it. Similarly, if the data value 360 can be described by using a plurality of different data types 334 (and/or 332), then, according to one aspect, the plurality of different data types 334 (and/or 332) may be included in the data template 200 for that element 305. Including more data types can increase the chances of a useful match.

The metadata can also contain element IDs 340 (i.e., identifiers) that identify the interface element by name. For example, the ID of interface element 338*a* could be "Birthday" and the ID of interface element 339*a* could be "Citycode."

The data value 360 (i.e., state) of each interface element having a data value is stored as part of the data template 200. Some interface elements 300, such as a container, may not have a data value 360. In one embodiment, a container does have a data value 360. By storing data values 360 in this manner, the data values 360 can be replicated into corresponding interface elements.

Figure 4A:
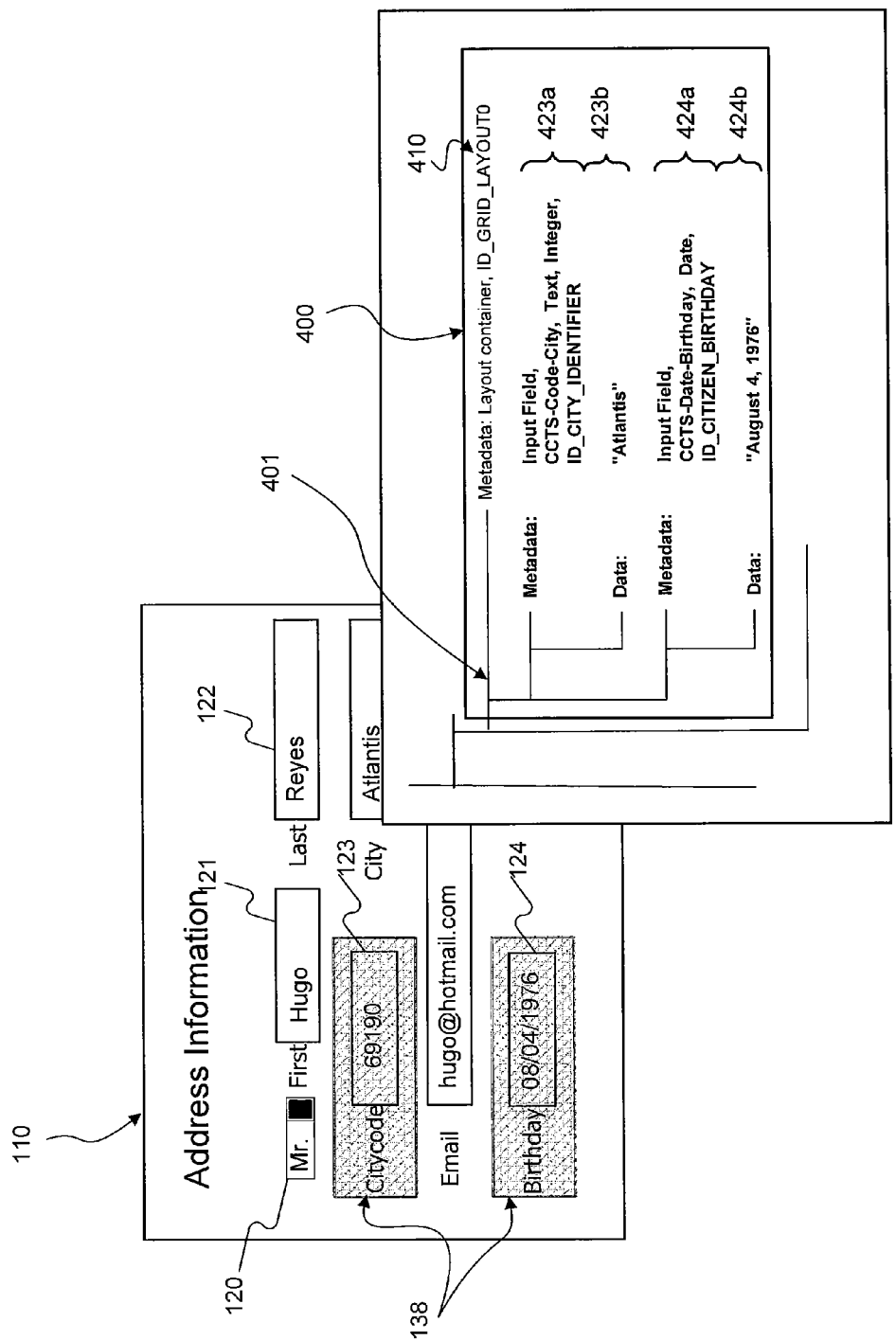
FIG. 4A is an exemplary illustration of a data template based on interface elements selected from the exemplary interface of FIG. 1, in accordance with an embodiment.

Thus, turning to FIG. 4A, an exemplary illustration contains a data template 400 according to the above examples. The tree structure 401 contains metadata 410, 423*a*, and 424*a* and data values (i.e., data) 423*b* and 424*b*. Describing metadata 423*a* in further detail, "InputField" is an element type; "CCTS-Code-City" is a custom data type; "Text" and "Integer" are generic data types; and ID_CITY_IDENTIFIER is an ID. "Atlantis" is the corresponding a data value 423*b*.

In the example of FIG. 4A, the selected interface elements 138 of FIG. 1 correspond to the metadata 401 of data template 400. For example, selected interface element 123 corresponds to the metadata 423*a* and data value 423*b*. Selected interface element 124 corresponds to metadata 424*a* and data value 424*b*. Unselected interface element 110 (a layout container) corresponds to metadata 410. Unselected interface elements 120, 121, and 122 are not represented in the data template 400. However, even these interface elements could be included in the data template 400 in an alternate embodiment. For faster systems, a larger data template 400 is less of a performance concern since the matching algorithm can be executed by the processor more quickly.

Figure 4B:
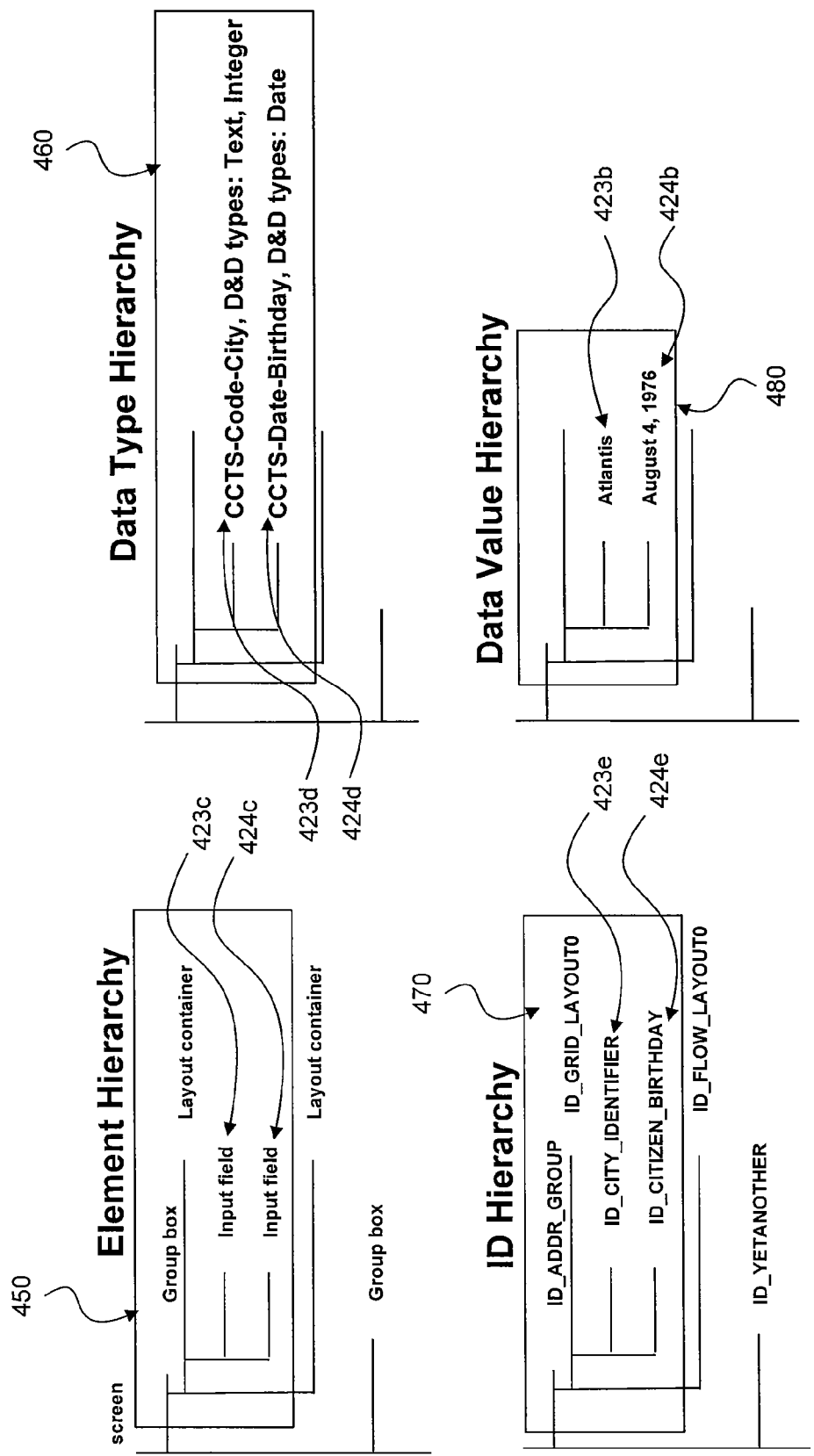
FIG. 4B is an exemplary illustration of various information hierarchies that can be associated with a data template created for selected interface elements of FIG. 1, in accordance with an embodiment.

Continuing with this example, FIG. 4B represents the data differently with a separate element hierarchy 450, data type hierarchy 460, ID hierarchy 470, and data hierarchy 480. Various embodiments may incorporate one or more of these hierarchies into data template 400. The hierarchy information of FIG. 4B correlates to the example data template 400 of FIG. 4A. For example, metadata 423*a* is represented by hierarchy information 423*c-e*, whereas metadata 424*a* correlates to hierarchy information 424c-f. Data values 423b and 424b remain unchanged, and also correlate to the same data values 423b and 424b shown in FIG. 4A. Each type of hierarchy can correspond to particular characteristics of the interface elements, arranged according to their arrangement on the screen. In one embodiment, the data template can comprise multiple hierarchies. The hierarchies can be independent from one another or stored together as part of a single tree, depending on the embodiment. Some applications may only recognize a subset of the different hierarchies available and/or stored in the data template.

In one embodiment, the data template 400 comprises separate tree structures for one or more different hierarchies 450, 460, 470, and 480. The metadata and/or data values of the data template 400 can be used in conjunction with one or more of the hierarchies 450, 460, 470, and 480 to identify corresponding interface elements.

Figure 5B:
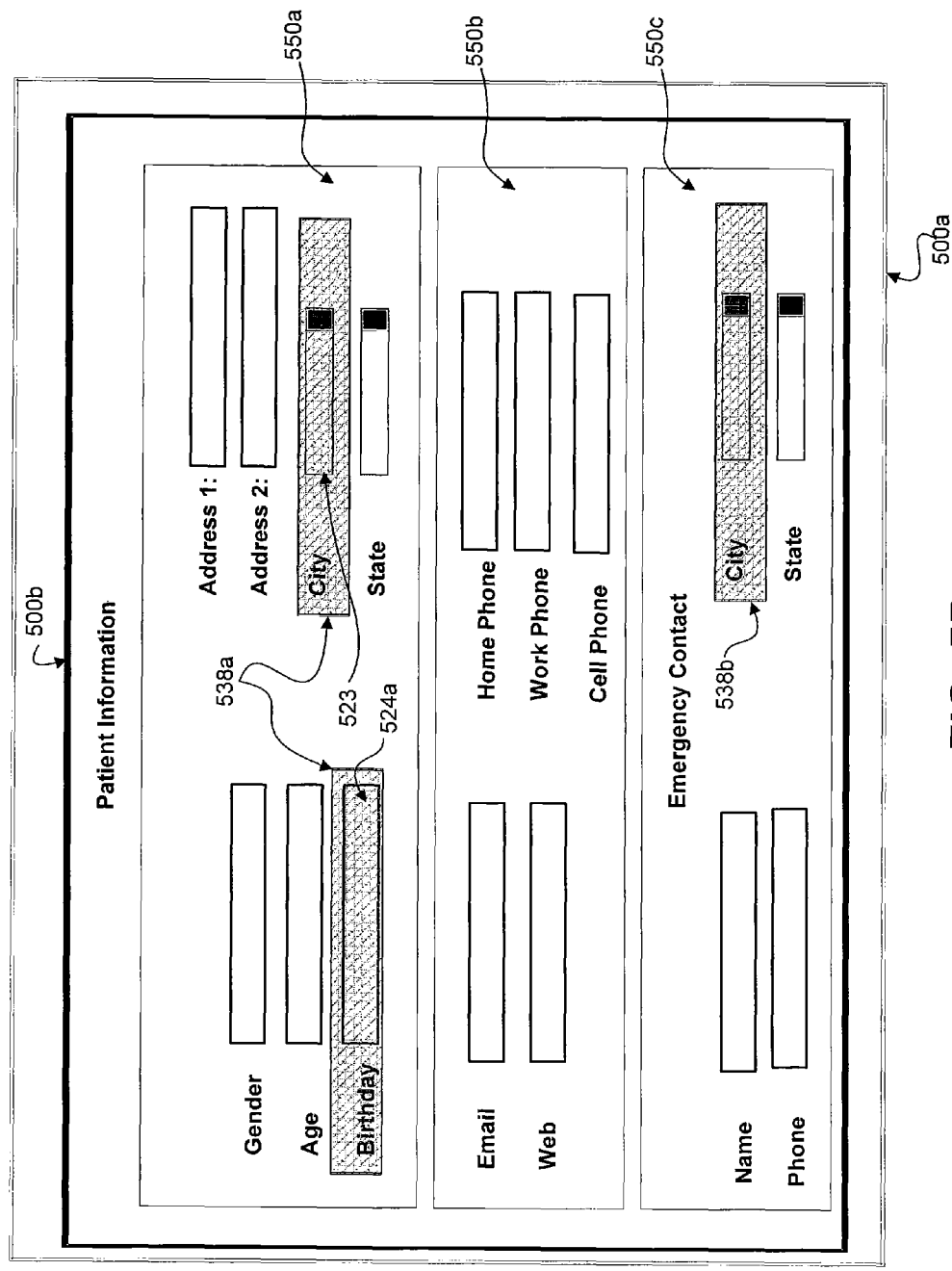
FIG. 5B is an exemplary illustration of a screen including a user interface with multiple corresponding interface elements that can receive replicated values, in accordance with an embodiment.

To this end, a comparison algorithm in accordance with one embodiment is now discussed in conjunction with FIGS. 5A and 5B. FIG. 5B illustrates a user interface screen 500a that is different from the user interface screen 100 of FIG. 1B. Thus, an embodiment identifies corresponding elements on screen 500a for selected elements 138 to facilitate parallel (i.e., simultaneous) data value replication.

A processor can execute the comparison algorithm to identify interface elements that might correspond to the interface elements described by the data template (i.e., the copied interface elements 138). The comparison algorithm compares information from the data template 400 against metadata of the displayed interface elements of the current interface screen 500a. This comparison is done because, unlike traditional systems that replicate data values serially, exemplary embodiments herein may detect corresponding interface elements for data values pasted in parallel (i.e., simultaneously). In one embodiment, the system determines where to replicate each copied data value. In another embodiment, the system receives a user selection of where to paste at least one interface element, and replicates values into additional interface elements based in part on the selection.

The comparison algorithm runs on an application layer in one embodiment, wherein the specific application executes the algorithm and determines whether the data template is useable within that application. For example, applications that do not recognize the data template also might not be programmed to have the processor execute the algorithm, and vice versa. In another embodiment, the operating system runs the comparison algorithm. In one aspect, the operating system communicates with applications to compare interface elements.

The comparison algorithm runs automatically after a data template is copied in one embodiment. In another embodiment, an action triggers the comparison algorithm. These actions include actions triggering a preview (discussed with regard to FIG. 5B, below), or actions related to pasting or dropping the interface element data values associated with data template 400.

Turning now to FIG. 5A, exemplary steps of a comparison algorithm will be discussed. The comparison algorithm can include steps illustrated in FIG. 5B, but can also include more or fewer steps in other various embodiments. As shown in FIG. 5B, the comparison algorithm can comprise a plurality of comparisons between various aspects of the data template 400 and interface elements on a screen 100. Additionally, each comparison can result in scores (i.e., point values), wherein the individual scores can be combined and compared against thresholds that indicate a correlation between one or more selected interface elements and one or more destination interface elements (i.e., correlating interface elements). In general, total scores correlate to higher levels of similarity between a group of elements and the data template 400. The number of comparisons, type of comparisons, point values, thresholds, and methods of summing and/or multiplying the scores can vary between embodiments.

Following the example of FIG. 5A, in step 510 the element hierarchy of data template 400 is compared to an element hierarchy of a current interface screen 500a. For example, interface screen 500a can comprise a container element 500b that is the root of the total screen hierarchy. The algorithm checks for similar patterns (e.g., similar arrangements of containers and modifiable interface elements) in the organization of interface elements, as compared to the element hierarchy of the data template. Using data template 400 of FIG. 4A (or element hierarchy 450 of FIG. 4B) as an example, this step of the comparison algorithm may locate structures of interface screen 500a that contain two modifiable interface elements (e.g., 523 and 524a of FIG. 5B) within a container (e.g., 550a). In one embodiment, a point value is awarded for a match, which in this case comprises a container containing two modifiable interface elements. If there is a further match, for example, if the container is contained within a group box as specified by data template 400, then a greater point value can be assigned. In the example of FIG. 5A, container 500b can be considered a root group box, that holds containers 550a, 550b, and 550c. In one embodiment, the screen 500a can be considered as a root group box, even if it does not define a container to hold the various interface elements that are displayed.

When the element hierarchy of the interface screen 500a (e.g., one or more element hierarchies based on the currently-displayed interface elements and any grouping interface elements) contains more interface elements than data template 400, data template 400 can be compared to different portions of the screen element hierarchy at a time. For example, if the total screen element hierarchy contains multiple containers, the hierarchies of each container can be separately compared against all or a portion of data template 400. These separate comparisons can be made recursively or iteratively, in one embodiment.

As shown in step 515, in this example the element hierarchy comparison at 510 is used to calculate a multiplier that contributes to a total score for one or more potential corresponding elements. Higher multipliers and/or scores can indicate a greater degree of similarity. In an embodiment that separately compares different parts of interface screen 500a to the data template 400, a plurality of multipliers can be maintained, with one multiplier corresponding to each part of the screen (e.g., each container) separately scored. Alternatively, one aspect includes a scoring system that does not base any multipliers on an element hierarchy comparison. In fact, depending on the embodiment, the multiplier of step 515 can correspond to one or more of the other comparisons or might not exist at all.

In one embodiment, the element hierarchy score can determine whether to perform additional comparisons of the interface elements within the element hierarchy. For example, if an element hierarchy comparison results in a multiplier 515 above a threshold, then other comparisons between the data template 400 and those same interface elements are made at steps 520, 530, and 535, and values based on the similarities of those comparisons are summed at step 525.

In another embodiment, some comparisons are done regardless of the element hierarchy score, such as any comparison that can indicate a correlation regardless of what other comparisons indicate (i.e., a "trump comparison"). For example, in one embodiment the interface element ID can be used to identify corresponding interface elements regardless of the element hierarchy.

Continuing with FIG. 5A, at step 520, data types of the data template 400 are compared against the data types of the interface elements on screen 500a (and, similarly, matches or near matches in data type may contribute to the multiplier calculated at step 515). The algorithm can check for similar data types as compared to the data template, and, in one aspect, weight the similarities higher if they occur at corresponding locations in the data type hierarchy (i.e., indicating that similar element types have similar data types). In one embodiment, this takes place as part of the element hierarchy comparison of step 520. In another embodiment, step 520 is performed as part of a data type hierarchy comparison, which can include analyzing each similar screen element hierarchy for similar data types (e.g., analyzing each screen data type hierarchy). The probability of correctly identifying corresponding interface elements can rise when greater numbers of data types match between the data template 400 and a screen data type hierarchy. Consequently, in one embodiment, the point value of each data type match increases based on the number of matches within a single element hierarchy.

In one embodiment, only direct matches between data types are assigned a point value (or otherwise credited) by the comparison algorithm. For example the direct match between interface element 524a and data template metadata 424a (representing interface element 124) is awarded a point value, which can be summed with other values in step 525.

Additionally, at step 520 the algorithm can take into account the similarity of data types, rather than just exact matches of data type. For example, a text box can have some similarity to a date box element, less similarity to a drop-down list, and most likely no similarity to a radio button. Similarly, a drop down list or break out box can be very similar to one or more radio buttons if similar options (e.g., item values) are presented. In view of this, data types that are typically more similar to one another can result in more points than data types that are typically dissimilar to one another.

Additionally, some data types are inherently more specific than others. For example, custom data types (e.g., CCTS-Code-City of metadata 423c of FIG. 4B) can typically represent a narrower collection of interface elements, and therefore can provide a greater indicia of similarity. Accordingly, in one embodiment, custom data type matches can carry a greater point value.

Further, as illustrated and explained with respect to data type hierarchy 460 of FIG. 4B, a single interface element can be characterized by multiple data types 423c (e.g., CCTS-Code-City, text, integer). A plurality of matches of data types between a single screen element and a single interface element of the data template can be a greater indicator of similarity. These comparisons can include both generic and custom data types for a particular selected interface element (that is part of the data template). Consequently, a greater number of data type matches for a single interface element can also carry a greater point value.

As shown in step 530, the comparison algorithm 400 can also compare ID metadata from the data template to the IDs of interface elements on screen 500a. In one embodiment, an exact match of IDs can automatically result in identifying the matching interface element as a corresponding interface element. In some applications, the ID names are standardized throughout an application or set of applications, and, therefore, provides a good indicator of corresponding interface elements. In another embodiment, matching ID are not assumed to indicate correlating interface elements without further corroboration. Therefore, the processor can assign a point value to the one or more similar IDs, and take into account the same sorts of indicia of similarity discussed with reference to the data type comparisons.

Turning now to step 535, the algorithm can also compare data values of the data template to selectable items of the interface elements on the screen in an embodiment. An "selectable item" includes an option that can be selected for an interface element. For example, each drop down list element contains a series of selectable items that can be selected by the user. Each item contains a text value and data value (though not necessarily the current data value of the interface element). (For example interface element 120 contain selectable items with text values "Mr.," "Ms.," and "Mrs." The data values could be, for example, 1, 2, and 3 respectively.) The algorithm can compare data values of the data template 400 to the text values and/or data values of selectable items of the interface elements on the screen 500a (or within a particular element hierarchy). This comparison can help confirm similarities between interface elements of different data types. For example, if the user copies a radio button with a data value of "Mrs.," the comparison can reveal a similarity to a drop down list containing a selectable item with a text and/or data value of "Mrs." Point values for similarities can be assigned in similar fashion as described above for other steps.

Depending on the embodiment, the results of the above comparisons can be weighted differently. In one instance, certain types of matches can trump all other comparisons. Additionally, the order in which the comparisons are made can vary, and the embodiments are not limited by the order of steps 510, 520, 530, and 535.

In the example of FIG. 5A, scoring the comparisons of steps 510, 520, 530, and 535 further comprises multiplying the multiplier of step 515 with the other summed point values of step 525 to arrive at a total score. As previously stated, an alternate embodiment does not utilize a multiplier, and a still further alternate embodiment uses other comparisons (such as 520, 530, and/or 535) to calculate the multiplier. Additionally, multiple total scores can be maintained for different element hierarchies in an embodiment.

Further, in one embodiment, the algorithm can locate matches between screen interface elements and the data template 400 even if every interface element in data template 400 cannot be matched to on screen interface elements. For example, in FIG. 5B, interface element 538b can be indicated as a corresponding interface element even if additional elements in the data template do not correspond to any interface element in container 550c.

At step 560, the total score and/or individual interface scores are compared to one or more thresholds in an embodiment to determine whether at least one correlating interface element exists. In another embodiment, a plurality of thresholds are used for comparison, with each threshold representing a different likelihood of correspondence.

In one embodiment, the comparison algorithm is utilized to choose paste and/or drop locations for the copied data values of data template 400. In another embodiment, the comparison algorithm is utilized to provide the user with one or more previews of where the copied data values of data template 400 can be pasted or dropped. For example, FIG. 5B is an exemplary illustration of an interface screen with a preview of locations for pasting data values from data template 400.

Turning now to FIG. 5B, an embodiment can include a preview so that the user can see where the data values will be pasted prior to pasting the data values at those interface elements. The preview can be generated based on the comparison algorithm in one embodiment. Therefore, generating the preview can include comparing the data template 400 against displayed interface elements to detect possible corresponding interface elements 538a and/or 538b, and indicating the existence of the possible corresponding interface elements 538a and/or 538b to the user.

In one embodiment, a preview of corresponding interface elements 538a and 538b is generated based on the comparison of data template 400 to the interface elements on a current interface screen 500a displayed to a user on the screen 500a of a display device. The preview can alert the user to possible interface elements 538a and 538b that correspond to the selected interface elements 138 (of FIG. 1B).

The preview can alert the user based on a variety of methods that can vary between embodiments. In one embodiment, corresponding interface elements 538a and 538b are highlighted for the user. Every potential corresponding interface element can be highlighted in one embodiment.

In another embodiment, the preview is generated based on a mouse-over event. A mouse-over event can occur when a user's pointer, touch-screen manipulation, or other activity is occurring above a particular zone on the interface 500a. For example, when the mouse is moved over a first interface element 524a, the preview is generated for other interface elements 523 and/or 538b that could also receive data values if the data template 400 is pasted or dropped into the first interface element.

In one embodiment, the preview highlights every potential corresponding interface element 538a and 538b that exists on the screen 500a. A given set of identified interface elements can be identified with a different color than another set of identified interface elements, such that the user can distinguish between sets of identified interface elements. The sets can also be color coded based on relative strengths of correspondence in one embodiment. In another embodiment, the preview can extend to include multiple interface screens for one or more applications. In another embodiment, the preview is limited to a single interface screen 500a.

In yet another embodiment, the preview is limited to a container in which the user interactions occur. For example, if the user touches, points, clicks, and/or hovers over and/or within container 550a, then a preview is generated based on the element hierarchy of 550a, resulting in highlighted interface elements 538a. In a similar embodiment, if the user's interactions take place within container 550b, then the preview might not highlight any interface elements unless the algorithm determines that at least one potentially corresponding interface element exists within container 550b. Similarly, mouse-over activities in container 550c can result in a preview that highlights interface element 538b.

In one aspect, the highlight can also represent the predicted strength of correspondence between a copied interface element and the correlating interface element. The color of each highlight can represent the strength of the highlight in one embodiment. For example, the highlight color of birthday interface element 524a could be green, indicating a strong match, whereas the highlight color of city drop-down interface element could be yellow, to indicated a weaker match. Other implementations to indicate the correlation strength, such as text effects (e.g., bold, italics, font size, font type, etc.), highlight shapes (e.g., rectangle, oval, diamond, etc.), and/or highlight symbols (e.g., star(s), asterisk, check marks, question marks, etc.) can be used to similar effect.

Additionally, in one embodiment, the preview can include visually representing the new data values in the potentially corresponding interface element(s). For example, continuing with FIG. 5A, interface element could be shown with the date "Aug. 4, 1976" and interface element 523 could be shown with "Atlantis" and/or city code "69190." In one embodiment, even if a first data value (e.g., 69190) is copied, metadata in the data template can link this first data value to a second data value (e.g., "Atlantis") of a data type appropriate for the destination interface element 523.

The preview can be invoked by a copy command in one aspect. For example, after the user has selected multiple interface elements and copied these elements onto the clipboard, the application automatically generates one or more previews. The processor can run the comparison algorithm, for example, each time a new interface screen 500a is presented.

In another embodiment, the preview is invoked in response to a command or hotkey. For example, the application could include a "paste preview" or similar command. In yet another embodiment, the preview is invoked in response to a mouse-over event. For example, when the user moves a pointer over a modifiable interface element or container, a preview can be generated as described above. In one embodiment, the preview will incorporate a modifiable interface that the user hovers over or otherwise selects, such that the preview is based on at least one destination interface element specifically indicated by the user.

In still another embodiment, dragging one or more interface elements as part of a drag-and-drop operation may invoke the preview. In this way, the user can see different drop locations that the application will recognize as applicable to the dragged interface elements.

Moving to the paste action, the data values of previewed interface elements 538a and 538b of FIG. 5A can be changed to represent the data values of the copied the selected elements of 138 of FIG. 1B, which are contained in the data template of FIG. 4A. Changing the data values through replication as described above can include duplicating the copied data values. Alternatively or in addition, replication can include setting a data value of a corresponding interface element to a value that is different from, but related to, the copied data value. For example, the copied Citycode 69190 of interface element 123 of FIG. 1B could be pasted as "Atlantis" in an embodiment. This can occur when the application can convert the integer 69190 into the city name "Atlantis." For example, the drop down list 523 may contain a selectable item with a text value "Atlantis" and a data value of 69190, which can be automatically selected as part of a paste operation. As used herein, a paste action can include a paste command or a drag-and-drop command.

In one embodiment, pasting the data values involves selecting a first plurality of corresponding interface elements rather than a second plurality of corresponding interface elements, wherein the selection is received before replicating the data values occurs.

Figure 6:
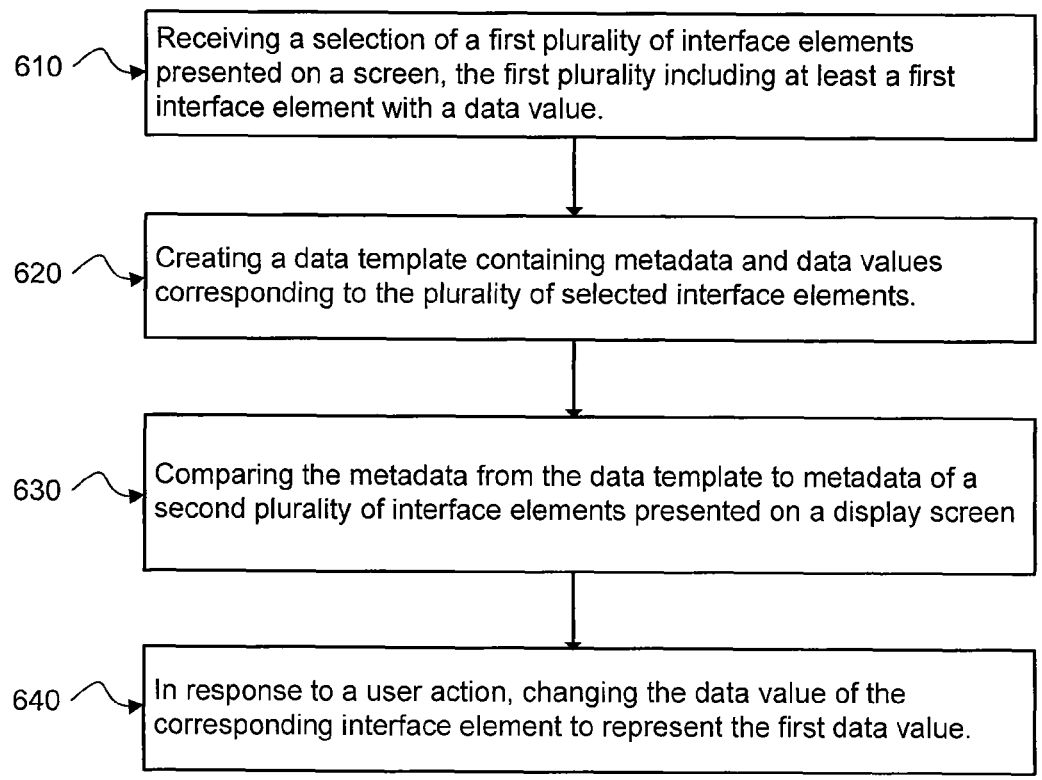
FIG. 6 is an exemplary flow chart for replicating data values from a first plurality of interface elements into a corresponding second plurality of interface elements, in an accordance with an embodiment.

Turning now to FIG. 6, an exemplary flow chart for replicating values of a plurality of interface elements is presented, in accordance with an exemplary embodiment. The steps can be performed, for example, by a processor in combination with input circuitry, such as a mouse, keyboard, and/or touch screen. The processor can execute instructions to perform the various steps.

More particularly, step 610 may include receiving a selection of a first plurality of interface elements presented on a screen, including a first interface element with a data value. The first interface element is not necessarily modifiable in one embodiment, but can be copied. The selection can be part of a copy event, such as a copy command or a drag-and-drop command.

Step 620 includes creating a data template containing metadata and data values corresponding to the plurality of selected interface elements. In one embodiment, the data template organizes information as previously described with respect to FIGS. 3-4B. The data template may be stored and accessed by other applications at a later time, in accordance with an embodiment.

Step 630 involves comparing the metadata of the data template to metadata of a second plurality of interface elements presented on the screen. The comparison may incorporate one or more aspects described with reference to FIG. 5B. As a result of the comparison, the system can identify at least one corresponding interface element in one embodiment. The comparison can be triggered as a preview in one embodiment, or, alternatively, as part of a paste action in another embodiment. For example, the paste location of the other copied data values can be determined by an algorithm, such as described in FIG. 5A.

In response to a user action, step 640 includes changing the data value of the corresponding interface element to represent the first data value. This action can be a paste action, such as a paste command or a drag-and-drop command. The data value of the corresponding interface element is changed to a duplicate of the first data value in one embodiment. In another embodiment, the data value of the first interface element is replicated so that it represents the same or similar information, but is not an exact duplicate.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for simultaneously replicating data values for multiple interface elements between interfaces of different applications or documents, the system comprising:
   a non-transient memory that stores instructions; and
   a processor coupled to the memory, the processor executing the instructions to perform stages comprising:
     receiving a user selection of a plurality of interface elements displayed on a display device in a first interface, the plurality of interface elements comprising metadata and data values;
     creating a data template that includes the metadata and data values;
     storing the data template in memory;
     comparing the data template to metadata of a second plurality of interface elements presented on the display device in a second interface;
     based on the comparison, identifying a first plurality of corresponding interface elements of the second plurality of interface elements that relate to the selected plurality of interface elements, wherein the first plurality of corresponding interface elements include data values; and
     changing the data values of the corresponding interface elements to represent the data values of the respective selected interface elements,
   wherein the first interface and second interface have at least one of a different organizational layout or different content around the multiple interface elements.

2. The system of claim 1, wherein the stages performed by the processor further comprise comparing the data template metadata to metadata of a third plurality of interface elements presented on a display device, wherein the third plurality of interface elements are located in a different container than the second plurality of interface elements.

3. The system of claim 1, wherein the stages performed by the processor further comprise:
   identifying, based on the comparison, a second plurality of corresponding interface elements that relate to the selected plurality of interface elements; and
   simultaneously displaying a first indication of the first corresponding interface elements and a second indication of the second corresponding interface elements.

4. The system of claim 1, wherein identifying a first plurality of corresponding interface elements includes identifying a first interface element with a first element type that corresponds to a second interface element of a second element type, wherein the first element type is different than the second element type.

5. The system of claim 1, wherein changing the data values of the corresponding interface elements comprises changing the data value of a first data type, wherein the corresponding interface element has a second data type that is different than the first data type.

6. The system of claim 1, wherein the data template includes an element hierarchy, data type information, and element identification information, wherein the data type information and element identification information is arranged according to the element hierarchy to form a data type hierarchy and an identification hierarchy respectively, and wherein the element hierarchy, identification hierarchy, and data type hierarchy are used in comparing the data template to metadata of the second plurality of interface elements presented on the display device.

7. The system of claim 1, wherein the processor further compares the data values in the data template to selectable data values of at least one interface element within the second plurality of interface elements, wherein the comparison to selectable data values is used in conjunction with the comparison of metadata to identify the first plurality of corresponding interface elements.

8. The system of claim 1, wherein comparing comprises determining a score of similarity between the data template and at least one of the second plurality of interface elements.

9. The system of claim 8, wherein identifying comprises identifying at one of the second plurality of interface elements that has a score of similarity above a predetermined threshold, as one of the first plurality of corresponding interface elements.

10. The system of claim 8, wherein a score of similarity is determined based on a similarity of at least one of element hierarchy, data type information, or element identification information.

11. A computer-implemented method for simultaneously replicating data values of multiple interface elements at a time between interfaces of different applications or documents, the method comprising:
    receiving a user selection of a first interface element and a second interface element, the first and second interface elements comprising metadata and data values, the first and second interface elements being presented in a first interface on a display device;
    copying the selected first and second interface elements by creating, via a processor, a data template that includes the metadata and data values;
    comparing metadata from the data template to metadata of a second plurality of interface elements presented on a display device in a second interface;
    based on the comparison, identifying a first corresponding interface element that relates to the first interface element, wherein the first corresponding interface element includes a modifiable data value; and in response to a paste action, changing the data value of the first corresponding interface element to represent the first data value, wherein the first interface and second interface have at least one of a different organizational layout or different content around the multiple interface elements.

12. The computer-implemented method of claim 11, wherein creating the data template includes adding the data template to a clipboard.

13. The computer-implemented method of claim 11, wherein the copying step and paste action are performed as part of a drag and drop operation.

14. The computer-implemented method of claim 11, wherein the data template metadata is arranged in an element hierarchy that represents the displayed relationship between the first and second interface elements, wherein the element hierarchy also represents at least one additional interface element not selected by the user.

15. The computer-implemented method of claim 14, wherein the comparing step further includes comparing the element hierarchy of the data template to the arrangement of interface elements displayed on the display device.

16. The computer-implemented method of claim 11, further comprising displaying an indication of the identified first corresponding interface element.

17. The computer-implemented method of claim 16, wherein the indication additionally displays a strength of the correspondence between the first interface element and the first corresponding interface element.

18. The computer-implemented method of claim 16, further comprising automatically generating a preview by providing a visual indicator that the first corresponding interface element corresponds to the first interface element and changing the first corresponding interface element to represent the first data value.

19. The computer-implemented method of claim 11, wherein the comparison step utilizes an element hierarchy, an identification value for the first element, and a data type for the first element in identifying the first corresponding interface element and a second corresponding interface element that relates to the second interface element.

20. A non-transient computer-readable medium containing instructions that, when executed by a processor, cause the processor to perform steps for simultaneously replicating data values for multiple interface elements between interfaces of different applications or documents, comprising:

receiving a user selection of a plurality of interface elements displayed on a screen in a first interface, the plurality of interface elements comprising metadata and data values;

creating a data template that includes the metadata and data values;

storing the data template in memory;

comparing the data template to metadata of a second plurality of interface elements presented on a display device in a second interface;

based on the comparison, identifying a first plurality of corresponding interface elements that relate to the selected plurality of interface elements; and changing the data values of the first plurality of corresponding interface elements to represent the data values of the respective selected interface elements, wherein the first interface and second interface have at least one of a different organizational layout or different content around the multiple interface elements.

21. The non-transient computer-readable medium of claim 20, wherein the data template includes an element hierarchy, a data type hierarchy, and an identification hierarchy, each of which are used in comparing the data template to metadata of a second plurality of interface elements presented on a display device.

22. The non-transient computer-readable medium of claim 20, wherein comparing the data template to metadata of a second plurality of interface elements includes comparing a custom data type and a generic data type corresponding to a selected interface element against a data type of a displayed interface element.

23. The non-transient computer-readable medium of claim 20, wherein the steps performed by the processor further comprise: receiving a selection from the user electing the first plurality of corresponding interface elements rather than a second plurality of corresponding interface elements that is identified based on the comparison, wherein the selection is received before changing the data values occurs.

* * * * *